United States Patent
Greene

(10) Patent No.: US 9,602,881 B1
(45) Date of Patent: Mar. 21, 2017

(54) APPARATUS, SYSTEMS AND METHODS FOR CONFIGURING A MOSAIC OF VIDEO TILES

(71) Applicant: EchoStar Technologies L.L.C., Englewood, CO (US)

(72) Inventor: Gregory Greene, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/995,689

(22) Filed: Jan. 14, 2016

(51) Int. Cl.
*H04N 21/482* (2011.01)
*H04N 21/462* (2011.01)
*H04N 21/442* (2011.01)
*H04N 21/458* (2011.01)
*H04N 21/472* (2011.01)

(52) U.S. Cl.
CPC ....... *H04N 21/4821* (2013.01); *H04N 21/442* (2013.01); *H04N 21/458* (2013.01); *H04N 21/462* (2013.01); *H04N 21/47214* (2013.01)

(58) Field of Classification Search
CPC combination set(s) only.
See application file for complete search history.

(56) References Cited

U.S. PATENT DOCUMENTS

| 8,731,373 | B2 * | 5/2014 | Gerbasi, III | G11B 27/034 386/278 |
|---|---|---|---|---|
| 9,170,738 | B2 * | 10/2015 | Gerbasi, III | G11B 27/034 |
| 2010/0332560 | A1 * | 12/2010 | Gerbasi, III | G11B 27/034 707/812 |

* cited by examiner

*Primary Examiner* — Kieu Oanh T Bui
(74) *Attorney, Agent, or Firm* — Lowe Graham Jones PLLC

(57) ABSTRACT

Media device systems and methods are operable to generate mosaic video formats that are each configured to generate corresponding mosaic videos that present video content in video tiles. An exemplary embodiment receives a selection of one of a plurality of mosaic video templates, receives a specification of a video mosaic name, and generates a mosaic video format. The generated mosaic video format is identified by the specified video mosaic name, and comprises the video tile location information and video size information for each of the video tiles defined by the selected mosaic video template.

20 Claims, 4 Drawing Sheets

APPARATUS, SYSTEMS AND METHODS FOR CONFIGURING A MOSAIC OF VIDEO TILES

BACKGROUND

Media devices, such as a set top box or the like, may be configured to concurrently present a plurality of different media content events to a user on a display using a mosaic video tile format. A mosaic video tile format is a media content presentation format that concurrently presents the video portion of the plurality of different media content events on the display using individually presented video tiles, wherein each of the presented video tiles (or portions thereof) are concurrently viewable by the user. The presented video tiles, interchangeably referred to herein as a video window, are typically presented using a region of the display that is smaller than a total display area of the display screen. Also, for a selected one of the plurality of different media content events, the audio portion of a presented media content event is also presented to the user.

The individual video tiles may have different sizes or may have the same size. With some video tile presentation formats, a smaller video tile will be superimposed over (presented over) a portion of a larger video tile. For example, when two different media content events are presented using a picture-in-picture (PIP) format, the smaller video tile will be presented over a portion of the full screen size image (here a full screen sized video tile). Here, the smaller video tile obscures the covered portion of the full screen video tile. Alternatively, the largest one of the video tiles may be smaller than the display area of the display such that one or more other video tiles are presented adjacent to the largest video tile using regions of the display that are not being used for presentation of the largest video tile. Alternatively, a plurality of equal sized video tiles may be concurrently presented on the display. For example, four or six equal sized video tiles may be concurrently presented on the display to the user. Any desired number, size, and/or presentation format may be used to concurrently present a plurality of different video tiles to a user.

However, configuring particular presentation formats of a mosaic video tile display may be a relatively difficult and time consuming task for the user in view of the many different available presentation format options that are available to the user. Further, in some situations, the user may prefer one type of mosaic video tile presentation format when viewing a particular genre (a class or category of media content having a particular form, theme, subject matter, production technique, or the like) of different media content events. At other times, the user may prefer a different mosaic video tile presentation format when viewing a different genre of media content. Thus, configuring a particular mosaic video tile presentation format based on the current user's viewing interests may be a relatively difficult and time consuming task for the user since a reconfiguration process may be required each time a different mosaic video tile presentation format is desired.

Also, selecting particular different media content events of interest is required of the user to populate each one of the different presented video tiles. For example, the user one day may be interested in watching a number of different sporting events (a first genre) that are concurrently being presented on different selectable channels of media content (different broadcasting stations, for example). Here, each video tile is used to present the video portion of a selected sporting event (based on the user selected channel, for example). Later that day, the user may be interested in watching a number of different news cast events (a second genre) that are concurrently being presented on other selectable channels. Reconfiguring the mosaic video tile presentation format to later present tiles of the selected news casts may be a relatively time consuming task for the user, even if the process of selecting a new different media content event for a particular video tile is a relatively easy task.

Further, one or more of the media content events of interest may have been previously recorded (stored) in a digital video recorder (DVR) of the media device, and/or may be available from another storage medium (such as a compact digital video disk, a flash memory drive, or video on demand source). For example, the user may be interested in watching a movie in one of the tiles that is available on a DVD or from the media device DVR while concurrently viewing the video portions of a plurality of concurrently broadcasting sporting events. Here, the video portion of the movie may be presented in a first video tile, and the video portion of the sporting events may be presented in other video tiles. Alternatively, or additionally, the user may be interested in playing a video game in one of the presented video tiles while watching the video portions of other broadcasting media content events. It is appreciated that the different viewing interests of any particular user at any given time, with respect to viewing the video portions of a plurality of different media content events using video tiles, are nearly limitless.

Accordingly, there is a need in the arts to enhance the user's experience for presentation of a plurality of different media content events using a mosaic video tile presentation format. More particularly, there is a need to make the process easier for the user to define and/or switch among different mosaic video tile presentation formats. Further, there is a need to make the process easier for the user to select the particular different media content events of current interest that are being presented in each of the different video tiles, particularly when the user is switching among different genres of media content events that may have use different mosaic video tile presentation formats.

SUMMARY

Systems and methods of generating mosaic video formats that are each configured to generate corresponding mosaic videos that present video content in video tiles are disclosed. An exemplary embodiment receives a selection of one of a plurality of mosaic video templates, receives a specification of a video mosaic name, and generates a mosaic video format. The generated mosaic video format is identified by the specified video mosaic name, and comprises the video tile location information and video size information for each of the video tiles defined by the selected mosaic video template.

BRIEF DESCRIPTION OF THE DRAWINGS

Preferred and alternative embodiments are described in detail below with reference to the following drawings.

DETAILED DESCRIPTION

Figure 1:
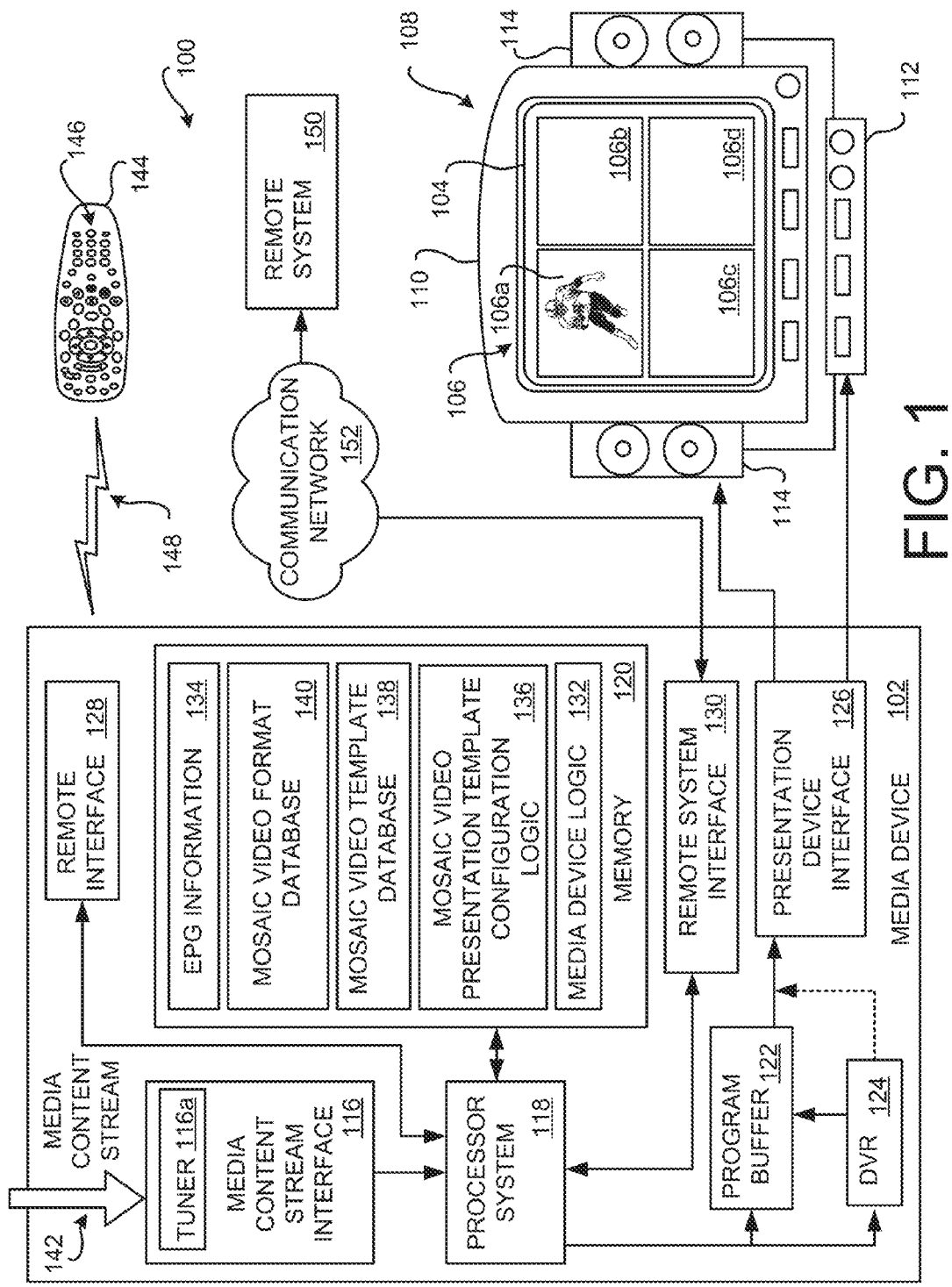
FIG. 1 is a block diagram of an embodiment of a mosaic video format configuration system implemented in a non-limiting exemplary media device.

FIG. 1 is a block diagram of an embodiment of a mosaic video format configuration system 100 implemented in a non-limiting exemplary media device 102, such as, but not limited to, a set top box (STB). Embodiments of the mosaic video format configuration system 100 may be implemented in other media devices that are configured to concurrently present a plurality of different media content events on a display 104 using a mosaic video tile presentation format. The display 104 may be a separate device or may be an integrated component of the media device 102. For example, but not limited to, the media device 102 may be a smart phone, note pad, laptop computer, or the electronic device operable to present video content on a display.

Embodiments of the mosaic video format configuration system 100 are configured to receive user input to pre-configure (predefine) a plurality of different mosaic video presentation formats that are used to generate mosaic videos that present different selected genre of media content. In an example embodiment, a user predefines a plurality of different mosaic video presentation formats prior to actual presentation of a plurality of different media content events on the display 104, using a mosaic video, to the user. For example, four equal sized video tiles 106 may be selected for defining a first mosaic video presentation format. Any desired number, size, and/or presentation format for the video tiles 106 may be used to define a particular mosaic video presentation format.

The exemplary first mosaic video presentation format may be particularly suitable for concurrently viewing a plurality of different broadcasting and/or recorded media content events. To illustrate, FIG. 1 shows a mosaic video presentation format that is used to present a mosaic video with four equal sized video tiles 106a-d on the display 104. Here, a first video tile 106a is conceptually illustrated as presenting a video image of a football player running during a football play. In this simplified hypothetical example, the user has pre-configured the first mosaic video presentation format (defined by four equal sized video tiles 106), then has optionally selected a genre associated with sporting events, and more particularly, football games (college and/or professional football games). Further, the user has defined a video mosaic name that is associated with the exemplary user-defined mosaic video presentation format. Accordingly, the other tiles 106b, 106c, and 106d may be envisioned by one skilled in the art as presenting the video portions of three other different football games that are being concurrently broadcast on other channels.

Embodiments of the mosaic video format configuration system 100 are configured to permit the user to define, and then select for later viewing, a plurality of different mosaic videos that are generated from other different user-defined mosaic video presentation formats, wherein each user-defined mosaic video presentation format is also optionally associated with a user specified genre and is identified by a video mosaic name. The video mosaic generated from each mosaic video format presents a unique number of video tiles that are presented using a unique configuration on the display 104.

For example, but not limited to, a second different user-defined mosaic video presentation format may be predefined by the user to have a first video tile 106a that is relatively large (using a large portion of the available display area of the display 104) and a plurality of three smaller sized video tiles 106 (each that use a relatively smaller portion of the display area of the display 104) oriented adjacent to and aligned vertically with each other, and located to one side of the larger video tile 106. Alternatively, the three smaller video tiles 106 may be adjacent to each other and aligned horizontally with each other, and located above or below the larger sized video tile 106. Such a second user-defined mosaic video presentation format may be particularly suitable for concurrently viewing a plurality of different genre-related media content events in a presented mosaic video, such as when the user specifies a video mosaic name associated with a genre characterized by news cast programs.

The various embodiments of the mosaic video format configuration system 100 may be configured to permit the user to pre-select (predefine) particular media content events of interest that are to be presented in a designated video tile 106 when a particular one of the predefined mosaic video presentation formats and genres (interchangeably referred to herein as a format/genre pair) are selected for presentation of a generated mosaic video. Here, for each user-defined mosaic video presentation format, the user is able to pre-define channels of interest that will be automatically accessed when that particular user-defined mosaic video presentation format is selected for generation of a presented mosaic video. When the user requests, operates, and/or configures the media device 102 to present media content using a first mosaic video presentation format, those pre-defined channels associated with an associated user specified genre are accessed such that the currently broadcasting media content events on those channels are accessed (tuned to) and are presented in its designated video tile in the associated user-defined mosaic video presentation format.

Alternatively, or additionally, some embodiments of the mosaic video format configuration system 100 are configured to automatically select one or more particular media content events of interest that are to be presented in one or more of the video tiles 106 when a particular one of the predefined mosaic video presentation formats are selected for generation of a presented mosaic video. Here, for one or more of the predefined mosaic video presentation formats, the mosaic video format configuration system 100 identifies and selects channels of interest that will be automatically accessed, and then presented in one of the video tiles 106, when that particular predefined mosaic video presentation format is selected for generation of a presented mosaic video. The automatic selection is made, at least in part, based on the user specified genre associated with the selected user-defined mosaic video presentation format. For example, a user's list of favorites or preferences for watching football games (the associated genre) may be used to select channels for a particular predefined mosaic video presentation format.

To illustrate operation of an exemplary embodiment, the user may know that four different channels will likely be concurrently broadcasting sporting events that they are likely to be interested in watching during a particular day of the week (or by date) and/or at a particular time. Thus, the user may initially select a mosaic video template that is preconfigured to present four equal sized video tiles 106 in a generated mosaic video. Then, the user may pre-specify the four different channels that are likely to be broadcasting a football game of interest. And, the user may specify a video mosaic name that is associated with the selected mosaic video template and the specified four channels. This information is used to define a user-defined mosaic video presentation format that is associated with the user's specified video mosaic name. For example, the user may know that on Sunday mornings during football season, channels 100, 101, 102 and 103 are typically scheduled to concurrently present a different football game during a specified time of the day. Accordingly, the user may define a video mosaic name (such as "Sunday Morning Football") for watching football games on the specified channels using a generated mosaic video. Here, a video mosaic name is an alpha numeric textual indicia that the user will intuitively remember. Further, the user may know that on Sunday afternoons, channels 100, 101, 112 and 113 are typically scheduled to present a different football game. Accordingly, the user may define a second video mosaic name that the user will intuitively remember (such as "Sunday Afternoon Football"). Any suitable alpha-numeric textual indicia may be used to specify a video mosaic name.

In practice, the user begins by initiating operation of the mosaic video format configuration system 100. In response to the user's initiation of operation of the mosaic video format configuration system 100, a pop-up menu, graphical user interface (GUI), tab, display area or the like is presented on the display 104 that indicates the video mosaic names of the user's predefined mosaic video presentation formats. The user may then navigate about the presented pop-up menu, GUI, tab, display area or the like to focus on a presented video mosaic name of interest (that identifies the particular user-defined mosaic video presentation format of interest to the user). Then, the user selects the focused video mosaic name. For example, the user may navigate to and focus on the presented video mosaic name of "Sunday Morning Football" (presumably, the user would perform this operation on a Sunday morning during the football season). In response to the user's selection, the mosaic video format configuration system 100 retrieves the associated user-defined mosaic video presentation format (defined by four equal sized video tiles 106) associated with the selected video mosaic name (here "Sunday Morning Football"), and then populate each of the video tiles 106 with the video portion of the media content being currently broadcast by the channels 100, 101, 102 and 103.

The user, if viewing the video mosaic that is presenting the plurality of programs in the video tiles 106, may then select one of the programs for full screen viewing. The user may navigate to, focus on, and then select a particular one of the videos tiles 106 of interest. In response, the video content associated with the selected video tile 106 is presented in a full screen mode. Audio content for that same channel may also be presented. The user may then return to the previously presented user-defined mosaic video presentation format at any time.

Then, later in the afternoon on Sunday, the user may wish to view the afternoon football games. At the appropriate time, the user selects the second video mosaic name "Sunday Afternoon Football" (presumably, on a Sunday afternoon during the football season). In response to the user's selection, the mosaic video format configuration system 100 then retrieves the associated user-defined mosaic video presentation format (defined by four equal sized video tiles 106), and then populates each of the video tiles 106 with the video portion of the media content being currently broadcast by the channels 100, 101, 112 and 113.

As another simplified hypothetical example, one skilled in the art appreciates that during some times of the year, different sporting event seasons may be underway, such as during football season and baseball season. Thus, a user-defined mosaic video presentation format may be associated with the genre of football, such that the user selected channels are those channels that are likely to be presenting football games. A second user-defined mosaic video presentation format may be associated with the genre of baseball, such that the user selected channels are those channels that are likely to be presenting baseball games. Here, the one or more of the selected channels may be the same for the first and the second user-defined mosaic video presentation formats (since the user may be watching baseball games on one day and/or time, and may be watching football games on a different day and/or time that is being broadcast on the same channel). To watch the plurality of football games, the user simply specifies the user-defined video mosaic name associated with the football games. To watch a plurality of baseball games, the user simply specifies the user-defined video mosaic name associated with the baseball games. One skilled in the art appreciates that the possible variations and configurations of concurrently viewing a plurality of different media content events using any number of user-defined mosaic video presentation formats is practically limitless.

Presentation of audio content is typically limited to a single channel associated with one of the videos tiles 106. In an example embodiment, the audio content from a focused on one of the video tiles 106 is presented. Thus, the user may refocus to a different video tile 106 to hear the audio content being broadcast on that associated channel. When the user-defined mosaic video presentation format is initially presented, some embodiments may present the audio content from a predefined one of the video tiles 106. The user may, in some embodiments, predefine this video tile 106 during the set up process wherein the user-defined mosaic video presentation format is initially defined by the user.

In some embodiments, closed captioning text may be presented in proximity of one or more of the video tiles 106. Thus, the user may hear the audio content from one of the video tiles 106, and also be able to read the closed captioning text for other video tiles 106. If the user wishes to hear the audio content of a particular video tile 106, the user can change the focus to that particular video tile 106 wherein the audio portion of the media content is then presented. In an example embodiment, the closed captioning text is then ended for that newly selected video tile 106. Further, close captioning text for the previously focused on video tile 106 may be generated and presented. Presentation of the closed captioning text may be an optional feature that the user may select for one, a plurality of, or all of, the video tiles 106.

The exemplary media device 102 is illustrated as being communicatively coupled to a media presentation system 108 that includes a visual display device 110, such as a television (hereafter, generically a TV), and an audio presentation device 112, such as a surround sound receiver controlling an audio reproduction device (hereafter, generically, a speaker). Other types of output devices may also be coupled to the media device 102, including those providing any sort of stimuli sensible by a human being, such as temperature, vibration and the like. The video portion of each of the media content events are displayed on the display 104. The audio portion of one of the selected video tiles 106 is optionally reproduced as sounds by one or more speakers 114. In some embodiments, the media device 102 and one or more of the components of the media presentation system 108 may be integrated into a single electronic device.

The non-limiting exemplary media device 102 comprises a media content stream interface 116, a processor system 118, a memory 120, a program buffer 122, an optional digital video recorder (DVR) 124, a presentation device interface 126, a remote interface 128, and an optional remote system interface 130. The memory 120 comprises portions for storing the media device logic 132, electronic program guide (EPG) information 134, mosaic video presentation template configuration logic 136, a mosaic video template database 138, and a mosaic video format database 140. In some embodiments, the media device logic 132 and the mosaic video presentation template configuration logic 136 may be integrated together, and/or may be integrated with other logic. In other embodiments, some or all of these memory and other data manipulation functions may be provided by and using remote server or other electronic devices suitably connected via the Internet or otherwise to a client device. Alternatively, the memory 120 may be implemented using a plurality of memory mediums. Other media devices 102 may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 142 multiplexed together in one or more transport channels. The transport channels with the media content streams 142 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 142 can be received from one or more different sources, such as, but not limited to, a cable system, a radio frequency (RF) communication system, or the Internet.

In an exemplary embodiment, one or more media content streams 142 (interchangeably referred to herein as a transport channel 142) are received by the media content stream interface 116. Typically, a media content stream 142 comprises a plurality of individual streams of media content that have been packetized into discrete packets, and then interleaved together into an assigned media content stream 142. The packets are identified (such as with a packet identifier or PID, or other suitable identifier) and are communicated (broadcast) in the media content stream 142 in a serial stream to the receiving media device 102. Thus, each media content stream 142 comprises a plurality of serially communicated media content streams. At any given time, each of the individual media content streams are associated with an identifier which corresponds to a "channel" as is known in the arts.

One or more of a plurality of tuners 116a in the media content stream interface 116 selectively tune to one of the media content streams 142 in accordance with instructions received from the processor system 118. The tuned-to media content stream 142 is selected based on a specified channel of interest (e.g., the channel information associated with the selected channel), wherein the specified channel is being received in the tuned-to media content stream 142. Preferably, the media device 102 has a plurality of tuners 116a, wherein the number of tuners 116a are at least equal to the maximum number of video tiles 106 that may be presented to the user on the display 104. However, one skilled in the art appreciates that is two or more channels may be interleaved together into a common media content stream 142, such that a single tuner 116a may be used to receive those channels. The plurality of tuners 116a may be implemented as hardware, software, or a combination of hardware and software (firmware) depending upon the embodiment of the media device 102.

Some media devices 102 receive other formats of media content streams such that tuners are not required. For example, a media device 102 receiving channel-based media content via a coaxial cable system (not shown) may receive and process media content events received in the media content stream 142 in a different manner.

The processor system 118, executing the media device logic 132 and based upon a request for a media content event of interest being broadcast on a particular channel specified by a user, parses out media content associated with the media content event of interest. When a plurality of video tiles 106 are presented, a corresponding plurality of tuners 116a each tune to receive the channels that have been specified for each of the presented video tiles 106.

The media content events of interest being presented in the video tiles 106 are then assembled into streams of video and/or audio information which may be stored (buffered) by the program buffer 122 as is known in the arts. Accordingly, the media content can be streamed out to components of the media presentation system 108, via the presentation device interface 126.

The exemplary media device 102 is configured to receive commands from a user via a remote control 144. The remote control 144 includes one or more controllers 146. The user, by actuating one or more of the controllers 146, causes the remote control 144 to generate and transmit commands, via a wireless signal 148, to the media device 102. The commands control the media device 102 and/or control the media presentation system 108. The wireless signal 148 may be an infrared (IR) signal or a radio frequency (RF) signal that is detectable by the remote interface 128. Accordingly, available media content is presented in accordance with the generated user commands.

From time to time, information populating the EPG information 134 is communicated to the media device 102, via the media content stream 142 or via another suitable media, from a content provider. The content provider typically provides the user the EPG information that contains content schedule information for a future predefined time, such as several weeks. This EPG information is stored in the EPG information 134 of the memory 120. The EPG information typically includes the title of particular media content events (interchangeably referred to herein as programs), a brief textual description of the media content event, the scheduled start and end times of the media content event, and at least one identifier. The EPG information may include the name of the programming station (or channel) or the like providing the media content event, and an optional brief textual description of the content that is generally provided by that programming station. An example channel identifier may be a numeric identifier and/or an alphanumeric identifier that is assigned to the programming station.

In practice, the user may request presentation of an EPG on the display 104. The EPG may be a type of a user interface that presents a menu, or a series of menus, on a display using a combination of text and symbols to indicate media content event viewing choices that may be selected by the user. The presented EPG information may include the title of available media content events, along with the scheduled time and date of the content presentation, and a brief description of the media content events. The EPG typically indicates the "channel" of the available content that identifies the originating source of the content, such as a television studio, a premium movie provider, a national program provider, etc.

In response to a user selection of a particular media content event indicated on the presented EPG, one of the tuners 116a tunes itself to receive the media content stream 142 having the channel associated with the selected media content event. The received media content event in the tuned-to media content stream 142 with the specified channel is then processed and stored into the program buffer 122. The buffered media content event is then streamed out from the program buffer 122 to the components of the media presentation system 108 in a continuous and uninterrupted manner.

Alternatively, or additionally, the user may have the media device 102 record and store the media content event in a memory, such as the example DVR 124, such that the user may later view the selected media content event at a more convenient time. The DVR 124 may be directly provided in, locally connected to, or remotely connected to, the media device 102. In alternative embodiments, the media content streams 142 may be stored for later decompression, processing and/or decryption Accordingly, the stored media content event can be optionally retrieved and presented in a specified one of the video tiles 106.

In some embodiments, the media device 102 may be operable to communicatively couple to a remote system 150 via a communication network 152. For example, the remote system 150 may have embodiments of the mosaic video format configuration system 100 with one or more of the mosaic video presentation template configuration logic 136, the mosaic video template database 138, and/or the mosaic video format database 140 residing locally in its memory medium (not shown).

The communication network 152 is illustrated as a generic communication system. In one embodiment, the communication network 152 comprises a cellular telephone system, such as a radio frequency (RF) wireless system. Accordingly, the media device 102 includes a suitable transceiver in the remote system interface 130. Alternatively, the communication network 152 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media that may be communicatively coupled to the remote system interface 130. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

The processes performed by the media device 102 relating to the processing of the received media content stream(s) 142 and communication of presentable media content events to the components of the media presentation system 108 are generally implemented by the processor system 118 while executing the media device logic 132. Thus, the media device 102 may perform a variety of functions related to the processing and presentation of one or more media content events received in the media content stream(s) 142.

Figure 2:
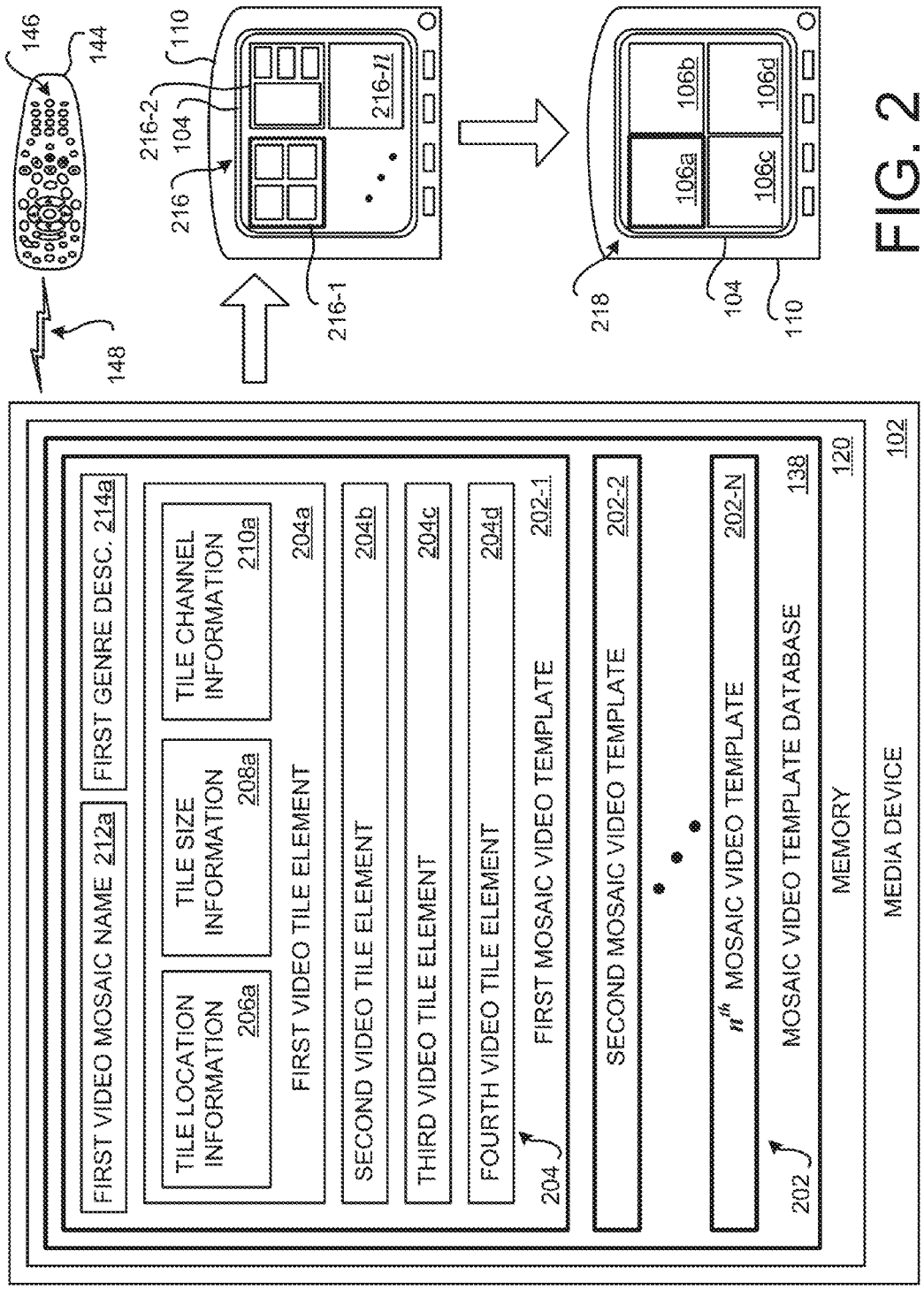
FIG. 2 is an illustrative diagram of an embodiment of a mosaic video template database residing in the memory.

FIG. 2 is an illustrative diagram of an embodiment of a mosaic video template database 138 residing in the memory 120. The mosaic video template database 138 comprises a plurality of mosaic video templates 202 that the user can select to define a particular user-defined mosaic video presentation format. The block diagram is intended to graphically represent elements of the mosaic video templates 202. One skilled in the art appreciates that the information for each mosaic video template 202 can reside as data constructed using any suitable database format. Further, some mosaic video templates 202 may have additional data elements, may have fewer data elements, and/or may have different data elements than those illustrated in FIG. 2.

The exemplary mosaic video templates 202 define a number of and a configuration of the plurality of video tiles 106 that are to be presented on the display 104. Accordingly, each mosaic video template 202 has a video tile element 204 for each of the plurality of defined video tiles 106. For each video tile 106, the associated video tile elements 204 contain a plurality of data elements that define attributes that are used to configure presentation characteristics of its associated video tile 106.

In an example embodiment, each video tile element 204 includes a tile location information 206 element that that has data that defines a presentation location of that associated video tile 106 when presented on the display 104. The location information of a video tile 106 can be defined in any desired manner. For example, a corner point, centroid point, or the like that specifies a particular location of the video tile 106 on the display 104 is specified for each video tile element 204.

Further, tile size information element has data that is used to define a size of that particular video tile 106. The size of a video tile 106, or its area, may be specified in any suitable manner. An exemplary embodiment defines a video tile 106 as a rectangle with four corner point locations for each corner point of the associated rectangular video tile 106. Alternatively, or additionally, the area of a video tile 106 may be defined (based on pixels, percentage of the display area of the display 104, and/or relative to other video tiles 106). Further, based on the tile location information 206 and the tile size information 208, it is possible for presented video tiles 106 to overlap each other when presented on the display 104, such as, but not limited to, using a picture in picture type presentation mode.

Optionally, the mosaic video template 202 may include tile channel information 210 element that has data that defines a channel or other suitable identifier information used by the processor system 118 and/or the tuner 116a to tune to the particular channel that is to provide the video content when that associated mosaic video presentation format is presented on the display 104. In an example embodiment, information for a predefined channel is specified in the tile channel information 210. Alternatively, a generic channel information may be in the tile channel information 210. When a user specifies a channel that is to be presented in a particular video tile 106, embodiments of the mosaic video format configuration system 100 access the channel information needed by the processor system 118 to tune to that particular channel. The information may be retrieved from the EPG information 134, or may be retrieved from another source. Thus, when the user sets up a user-defined mosaic video presentation format, the selected mosaic video template 202 has a data format that supports the user's specification of a channel of interest for that particular video tile 106.

Optionally, a mosaic video template 202 may include a video mosaic name 212 element for the alpha-numeric data that defines the mosaic video template 202. Any suitable identifier may be used for the name of a mosaic video template 202. In the various embodiments, the user may elect to change the information in the video mosaic name 212 element when the user is defining a user-defined mosaic video presentation format (thus specifying the video mosaic name that the user will intuitively understand and remember).

To illustrate operation of an example embodiment, FIG. 2 illustrates a hypothetical image of a plurality of miniaturized graphical template representations 216 presented on the display 104 in response to the user operating the remote control 144 to initiate operation of the mosaic video format configuration system 100. In this simplified example, each different miniaturized graphical template representation 216 indicates the configuration of the video tiles 106 associated with one of the mosaic video templates 202. A miniaturized graphical template representation 216 is an image that graphically indicates a relative size and a relative location of each of the video tiles defined by its associated mosaic video template 202. That is, each miniaturized graphical template representation 216 indicates graphically to the viewing user the relative size and the relative location (with respect to their size and location in a full-sized video mosaic) of each of the video tiles defined by its associated mosaic video template 202.

For example, the miniaturized graphical template representation 216-1 illustrates a possible configuration of the first mosaic video template 202-1 that is configured to present four video tiles 106. Thus, upon viewing the miniaturized graphical template representation 216-1, the user understands that a presented mosaic video presentation format based on this particular template will present video content in four equal-sized video tiles 106, each presented in one of four quadrants of the display 104.

In contrast, the miniaturized graphical template representation 216-2 illustrates a possible configuration of another mosaic video template 202 that is also configured to present four video tiles 106. Thus, upon viewing the miniaturized graphical template representation 216-2, the user understands that a presented mosaic video presentation format based on this particular template will present video content in a relatively larger video tile 106 located on the left hand side of the display 104, and will present three smaller equal-sized video tiles 106 as shown on the right hand side of the display 104.

One skilled in the art appreciates that any number of different configurations for mosaic video tiles 106 are possible. Here, the miniaturized graphical template representations 216 demonstrate that miniaturized representations of four mosaic video templates 202 can be indicated on the display 104. However, any suitable number of miniaturized graphical template representations 216 can be concurrently presented on the display 104 depending upon the embodiment of the mosaic video format configuration system 100. If there are more defined mosaic video templates 202 than can be concurrently indicated (using their corresponding miniaturized graphical template representations 216) on the display 104, then a scrolling or paging operation may be used to present the additional miniaturized graphical template representations 216 to the user.

Once the user has identified a particular one of the miniaturized graphical template representations 216 of interest, the user may focus on and then select that particular miniaturized graphical template representation 216 of interest. That is, the user selects a mosaic video template 202 of interest by navigating to and focusing on a corresponding one of the miniaturized graphical template representations 216 of one of the mosaic video templates 202 that is of interest. Focusing on an active region on the display 104 associated with a miniaturized template representation is conceptually illustrated using a bold outlining of that active space on the display 104. Any suitable method of indicating a focused-to active region identifying one of the miniaturized graphical template representations 216 may be used by the various embodiments.

In some applications, a single full sized representation of a mosaic video template 202 may be optionally presented, such as when the user focuses on a particular one of the miniaturized graphical template representations 216. Here, the full sized representation may be presented for some predefined duration, such as several seconds, before returning to the previously presented miniaturized graphical template representations 216.

FIG. 2 illustrates that a presented image of a selected mosaic video template is then presented on the display 104 in response to the user's selection of the associated miniaturized graphical template representation 216-1. Here, this simplified hypothetical example indicates that the user has focused to and then has selected the miniaturized graphical template representation 216-1 that corresponds to the first mosaic video template 202-1. One skilled in the art thus appreciates that the user intends to create a mosaic video presentation format based on the mosaic video template 202-1 that presents video content in four equal-sized video tiles 106*a-d*.

Next, the user optionally specifies one or more particular channels of interest that will be used to access video content in each of the video tiles 106*a-d*. Here, the user has focused on the first video tile 106*a* (conceptually indicated by the bold outlining of that active space on the display 104). Upon selection of the focused video tile 106*a*, the user may then specify the particular channel that will provide video content for the video tile 106*a* (when the associated user-defined mosaic video presentation format is presented).

In an example embodiment, a pop-up window (not shown) may be presented that permits the user to specify the channel of interest. For example, an active area of the pop-up may permit the user to type in a channel identifier or the like. Alternatively, or additionally, the EPG information 134 (FIG. 1) may be accessed such that an EPG (not shown) is presented on the display 104. The user may then navigate about the presented EPG, focus on the channel of interest, and then select that channel (much like a user selects a particular channel of media content for viewing or recording using a presented EPG). Once the channel is selected by the user, the corresponding channel information may be saved (stored in the tile channel information 210 element) for generation of the user-defined mosaic video presentation format.

After a first channel has been identified, the user may similarly select other channels for the other video tiles 106*b-d*. The user may operate the remote control 144 to navigate to other ones of the video tiles 106*b-d*. Alternatively, or additionally, the focus may automatically move to the next video tile 106*b* or another one of the video tiles. Once the user has defined at least one channel for a particular mosaic video template 202, the user may then exit the channel selection phase of setting up a user-defined mosaic video format.

At some point during the set up process, the user specifies a video mosaic name 212 that is used to identify the mosaic video presentation format. In an example embodiment, an optional generic name is initially stored in the video mosaic name 212 element of the mosaic video template 202. Any suitable identifier may be used. The user may then modify the generic template name, if used, to a user defined video mosaic name that the user will intuitively understand and/or remember. For example, if the user is setting up a user-defined mosaic video presentation format to watch football games, the user may specify "Football" as the video mosaic name 212. The user may specify the information for the video mosaic name 212 at any suitable time during the set up process. For example, a pop up window or the like may be initially presented to the user upon initialization of the set up process. Alternatively, the pop up window or the like may be presented to the user at the conclusion of the set up process. Alternatively, or additionally, an active window may be presented as part of the image 218 that the user may navigate to and focus on for specification of the video mosaic name 212. Alternatively, or additionally, a small graphical icon or the like (not shown) may be presented on the image 218 that the user can focus to and select, wherein the pop up window for specifying the name is then presented. Alternatively, or additionally, the user may actuate one or more of the controllers to cause presentation of the pop up window for specification of the video mosaic name 212.

Additionally, the user may provide information that generally describes or defines the genre that is associated with the user-defined mosaic video presentation format. An optional genre description (Desc.) 214 element may be in each mosaic video template 202. The user may specify the genre description information in a similar manner as for specifying the video mosaic name 212. An advantage of using the optional genre description 214 is that the user specified video mosaic name may be relatively short and simple, and thus not provide sufficient information describing the intended genre. Here, the user may specify detailed information that describes the intended genre.

In some instances, the user may not specify channels for one or more of the video tiles 106 during the set up process. That is, a user-defined mosaic video presentation format may have one or more video tiles 106 that do not have a user-specified channel (interchangeably referred to herein as an "open video tile"). In such situations, the mosaic video format configuration system 100 may automatically identify and automatically select a channel that will provide video content in the open video tiles 106.

For example, the channel for an open video tile 106 may be selected based on the user specified data stored in the genre descriptor 214 element and/or the video mosaic name 212 element. In an example embodiment, user-specified time information is included in the genre descriptor 214 element, wherein the genre time information corresponds to a time that the mosaic video is anticipated to be presented to the user. For example, if the genre relates to "Sunday Afternoon Football," the time information may be a specific afternoon time, a time range in the afternoon, or another time period that is associated with afternoon football games.

For such open video tiles 106, the mosaic video format configuration system 100 accesses the EPG information 134 (FIG. 1) in an example embodiment. The genre information is compared with program information describing programs scheduled for broadcast to the media device 102 at times corresponding to the genre time information. That is, the EPG program description information is compared for those programs having a scheduled broadcast time that matches the time information in the genre information.

When a match is found between the EPG program description information and the optional genre description 214 and/or the video mosaic name information, that channel may be selected and used to provide the video content for that open video tile 106. That is, the mosaic video format configuration system 100 is configured to automatically identify media content events that have descriptions, titles, or the like, that correspond to the information of the genre descriptor 214 and/or the video mosaic name 212, and that has a scheduled broadcast time that corresponds to the genre time information of the genre descriptor 214 element.

To illustrate, the genre descriptor 214 may contain the user-specified information "Football, college, afternoon, east coast" to indicate that the user is interested in watching college football games being played by east coast teams during the afternoon. When the user initiates presentation of the mosaic video for watching football games, the mosaic video format configuration system 100 searches the EPG information 134 to identify one or more channels that are scheduled to present an afternoon college football game being played by an east coast team. The identified channel is then used to provide the video content in the presented open video tile 106. That is, the channel information is automatically specified for and is stored in a generated mosaic video format.

If multiple channels presenting college football games being played by an east coast team are identified, then one of the plurality of identified channels must be selected for presentation in the open video tile 106. The selection between conflicting identified channels may be random. Alternatively, the selection may be based on another characteristic. For example, but not limited to, the channel may be selected based on a learned or specified user preference. If the user prefers ivy league east coast football teams, then the channel selected may be based on presentation of an ivy league east coast football team over other east coast teams. Additionally, or alternatively, the user may have predefined a particular team as a favorite. Thus, the channel presenting the user's favorite team may then be identified such that that particular game is then presented in the open video tile 106.

Alternatively, or additionally, a user may be presented a pop-up window, graphical user interface (GUI), or the like identifying the conflicting channels. The list of identified channels presented to the user may be based on an association with the optional genre description 214 and/or the video mosaic name information. Alternatively, or additionally, the list of identified channels may be based on a user's favorites list, viewing history, and/or a recommendation list, as is known in the arts. Based on the presented list of identified channels, the user may select one of more of the channels for the open video tiles 106. The presented list of identified channels may look and operate similar to a presented EPG in some embodiments. The user may then select a channel of interest by navigation about the presented a pop-up window or GUI. The user-selected channel is then used to populate the open video tile 106 with the video content currently being broadcast on that channel. Any suitable selection channel selection algorithm may be used in the various embodiments. Further, the user may choose to replace one of the channels with a selected channel for a particular video tile 106.

Alternatively, or additionally, a channel for an open video tile 106 may be automatically selected in response to the user's request for presentation of the associated video mosaic. In this situation, no particular channel has been predefined based on the time information of the genre descriptor 214 element (which is presumably absent or has been omitted during generation of the user-defined mosaic video format). Here, the mosaic video format configuration system 100 analyzes the EPG description meta data for currently presented programs (since no genre time information has been included in the genre descriptor 214 element). When a match is found between currently broadcasting programs described in the EPG information and the optional genre description 214 and/or the video mosaic name information, that channel may be selected and used to provide the video content for that open video tile 106. That is, the mosaic video format configuration system 100 is configured to automatically identify currently broadcasting media content events that have program descriptions, titles, or the like, that correspond to the information of the genre descriptor 214 and/or the video mosaic name 212.

Figure 3:
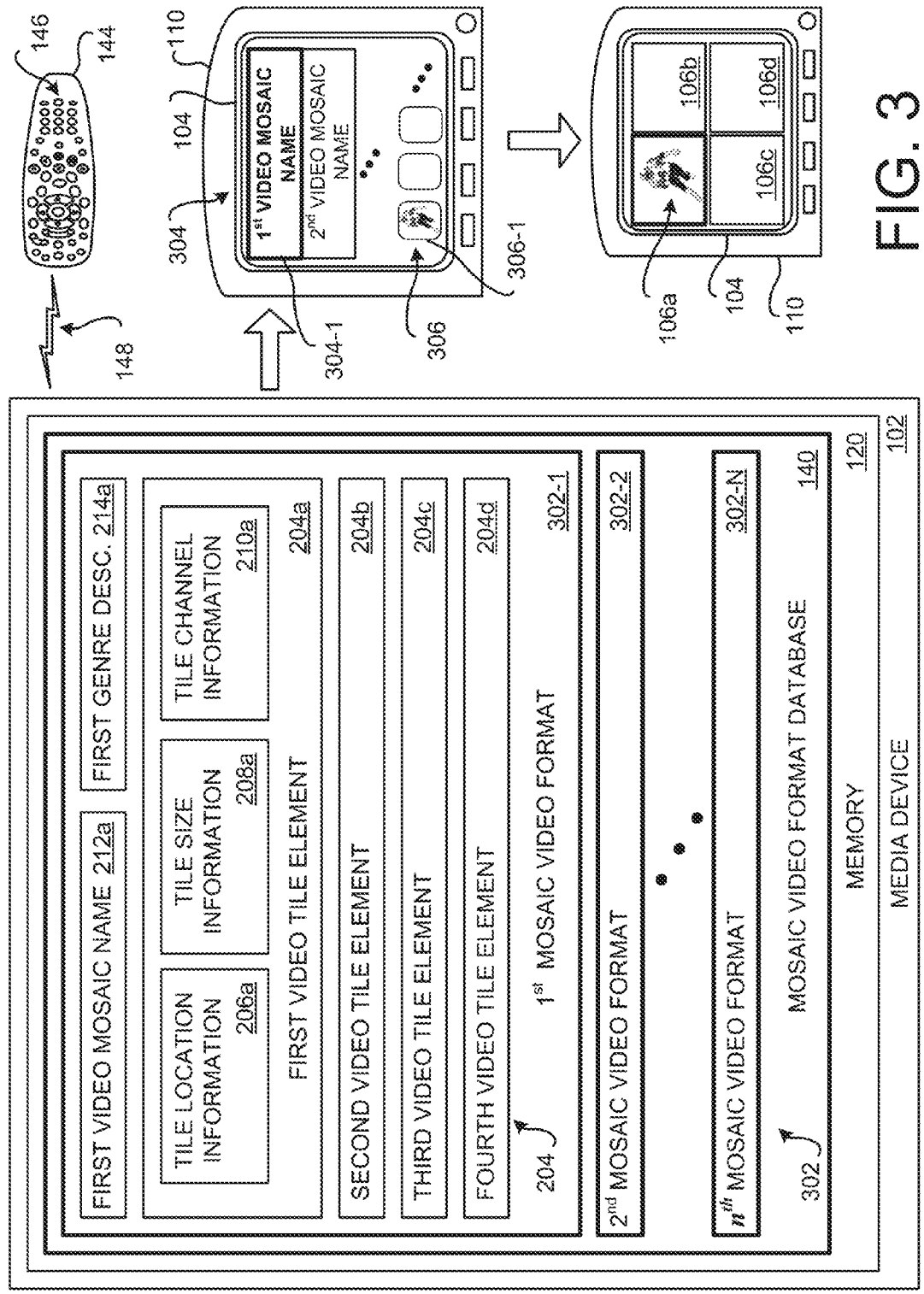
FIG. 3 is an illustrative diagram of an embodiment of a mosaic video format database residing in the memory.

FIG. 3 is an illustrative diagram of an embodiment of a mosaic video format database 140 residing in the memory 120. The mosaic video format database 140 comprises a plurality of mosaic video formats 302 that the user or another entity has predefined based on a selected mosaic video template 202 (FIG. 2), a specified video mosaic name 212, and the optional genre information. The block diagram is intended to graphically represent example elements of the mosaic video format database 140. One skilled in the art appreciates that the information for each mosaic video format 302 can reside as data constructed using any suitable database format. Further, some mosaic video formats 302 may have additional data elements, may have fewer data elements, and/or may have different data elements than those illustrated in FIG. 3.

In practice, the data of a particular mosaic video template 202 is retrieved and then is populated with the information specified by the user or another entity, as provided during the above-described set up process (see FIG. 2). At the conclusion of the set up process, a mosaic video format 302 is generated and saved based into the mosaic video format database 140 as one of the mosaic video formats 302.

For example, the first mosaic video format 302-1 has data defining the attributes (location and size attributes) for each one of four video tiles 106. For illustrative purposes, the mosaic video format 302-1 corresponds to a user selection of the first mosaic video template 202-1 in this simplified hypothetical example. Accordingly, the information that defines the attributes of each video tile 106 used to generate a mosaic video format 302 is initially stored in the corresponding mosaic video template 202-1. Further, the user has, during the set up process, defined one or more of the channels and/or the associated channel information to be used to provide video content to the particular video tiles 106a-d. Depending upon the configuration of the currently presenting video mosaic that is based on a selected mosaic video format 302, the video content of each of the user-specified channels is used to populate each of the video tiles 106a-d. Alternatively, one or all of the channels providing video content may be automatically selected by embodiments of the mosaic video format configuration system 100 as described herein. Also, the user specified information defining the video mosaic name 212 element, and any optional information defining the genre description 214 element, is also saved into the mosaic video format 302.

Accordingly, one skilled in the art appreciates that the mosaic video format database 140 has a plurality of user-defined or third party defined mosaic video formats 302, each uniquely identified by its video mosaic name. Any number of mosaic video formats 302 may be stored in the memory 120 of the media device 102. Alternatively, or additionally, one or more of the mosaic video formats 302 may be communicated to, and then stored at, the remote system 150 for later retrieval and/or for later use by another media device 102.

In practice, the user initializes operation of the mosaic video format configuration system 100 to present a mosaic video having video content that is of interest to the user. To conceptually demonstrate operation, FIG. 3 illustrates an example electronic guide 304 on the display 104 as a simplified hypothetical example. Here, the mosaic video format configuration system 100 initially accesses the video mosaic names of each of the stored mosaic video formats 302 stored in the mosaic video format database 140.

Then, an electronic guide 304 is generated and presented to the user. The electronic guide 304 indicates the accessed video mosaic names using a suitable presentation format on the display 104. In an example embodiment, the video mosaic names may be presented as a listing of video mosaic names. The electronic guide 304 is similar to an EPG in operation in that the user may operate their remote control 144 or another interface to navigate to and then select a listed video mosaic name of interest (that is associated with a mosaic video format 302 that the user wishes to use for generation of a presented video mosaic).

In this simplified hypothetical example, the portion 304-1 of the electronic guide 304 corresponding to the first video mosaic name 212a has been navigated to and focused on by the user (or may be focused on initially when the electronic guide 304 is first presented). Focusing of that active region associated with the first video mosaic name on the display 104 is conceptually illustrated on the display 104 (and thus associated with the stored first mosaic video format 302-1) as being represented with a bold outlining of that active region. Any suitable method of indicating a focused-to active region on the display 104 that is associated with a video mosaic name may be used by the various embodiments.

In response to the user's selection of the portion 304-1 of the electronic guide 304 corresponding to the first video mosaic name 212a corresponding to the first video mosaic name 212a, presentation on the display 104 transitions to a mosaic video that is based on the mosaic video presentation format 302-1 that is associated with the portion 304-1 of the electronic guide 304 corresponding to the first video mosaic name 212a. Accordingly, each of the video tiles 106a-d present the video content of the particular channels (user-selected or automatically selected). For example, the football player is shown in the video tile 106a as described hereinabove (see also FIG. 1).

Alternatively, or additionally, some embodiments may graphically indicate available mosaic video presentation formats 302 to the user. FIG. 3 conceptually illustrates a plurality of graphical icons 306 that each correspond to a video mosaic name and/or a mosaic video presentation format 302. In some embodiments, the user may select or define a particular graphical icon 306 instead of, or in addition to, selecting or specifying a particular video mosaic name.

To illustrate an exemplary embodiment, the graphical icon 306-1 is conceptually illustrated as presenting an image of a football player. Here, the image may be a still image previously selected by the user from a plurality of available still images, graphical icons, and/or emojis. Or, an image (still or video) may be generated from the currently broadcasting video content associate with one of the video tiles 106 of that particular mosaic video presentation format. Thus, the user intuitively knows and/or remembers that the presented graphical icon 306 is associated with a particular mosaic video presentation format 302 of interest. Thus, if the user focuses to and then selects the graphical icon 306-1, then mosaic video presenting the four video tiles 106 showing football games will be then presented on the display 104.

In various situations, a communication link may be established between the remote system 150 (FIG. 1) and the media device 102. In one application, the user may communicate one or more of their user-defined mosaic video presentation formats 302, the associated video mosaic name, and the optional genre information to the remote system 150 for storage. The user, if operating a different media device 102, may then retrieve one or more of their stored user-defined mosaic video presentation formats 302 from the remote system 150. Accordingly, a mosaic video based on the retrieved user-defined mosaic video presentation format 302 is presented on that different media device 102, wherein the channels of interest will be presented in the video tiles 106.

In some situations, the user may wish to share their stored user-defined mosaic video presentation format 302 with other users. The user may communicate the shared user-defined mosaic video presentation format 302 from their media device 102, directly to the other media device 102. Alternatively, or additionally, the user may permit or authorize the other user to access their stored user-defined mosaic video presentation format 302 from the remote system 150.

Further, the one or more mosaic video presentation formats 302 stored remotely at the remote system 150 may reduce memory storage requirements at the media device 102. Any suitable data storage system and data accessing system of a remote system 150, including data security features, may be used by the mosaic video format configuration system 100 to control storage and access to user-defined mosaic video presentation formats received from multiple users.

Alternatively, or additionally, a plurality of individual mosaic video templates 202 may be stored at the remote system 150. When the user is configuring a user-defined mosaic video format 302 for watching a plurality of media content events using a video mosaic, one or more of the mosaic video templates 202 may be communicated from the remote system 150 to the media device 102. In an example embodiment, a plurality of miniaturized graphical template representations 216 may be communicated to the media device 102 and then be presented to the user to indicate mosaic video templates 202 that are available from the remote system 150. In some embodiments where mosaic video templates 202 are stored at the media device 102, new or modified mosaic video templates 202 may be developed, which may then be automatically communicated (pushed) to the media device on a periodic basis or at other suitable times, such as after a new or modified mosaic video template is available.

Alternatively, or additionally, a predefined mosaic video format and an associated video mosaic name may be defined by a third party and optionally stored at the remote system 150. This third party defined mosaic video format 302 and video mosaic name may then be communicated to the media device 102 and stored for later use by the user. Alternatively, or additionally, such third party defined mosaic video format 302 may be stored remotely and the remote system 150 and then accessed by the media device 102 if the user selects presentation of a mosaic video that is based on that remotely stored third party defined mosaic video format 302.

For example, the third party may have a plurality of programs that may be available for viewing at a particular time on a particular day. A third party defined mosaic video format 302 and video mosaic name may be communicated to the media device 102. Such an application of the mosaic video format configuration system 100 may be a desirable marketing tool used by a content provider. For example, but not limited to, the programs presented in a video mosaic may be new program series that are now available for the first time, such as at the start of a program season. Here, the user may not otherwise be aware of these newly available programs. The mosaic video generated based on the third party defined mosaic video format 302 would inform the user or otherwise heighten the user's awareness of the newly available programs. Further, at some later point in time, that third party defined mosaic video format 302 could be deleted, erased, overwritten or otherwise discarded from the memory 120.

Another example may occur when a plurality of seasonal programs are available, such as at Christmas time or another holiday. Such seasonal programs may not be practical or convenient for the user to find on an EPG so as to define a user-defined mosaic video format 302, particularly since such a user-defined mosaic video format 302 may only be used one or two times before becoming obsolete. Accordingly, the third party defined mosaic video format 302 could be communicated to the media device 102 for use by the user. Further, at some later point in time, that third party defined mosaic video format 302 could be deleted, erased, overwritten or otherwise discarded from the memory 120.

Another example may be related to a sporting event, such as the Olympics, wherein a plurality of different type sporting events may be concurrently available for viewing at any given time. Because it may not be practical or convenient for the user to select channels broadcasting particular events, the third party could provide that service. Here, the user could select the third party defined mosaic video format to view a video mosaic of the different broadcasting sporting events, and then select one event of interest for full screen viewing. Further, at some later point in time, that third party defined mosaic video format 302 could be deleted, erased, overwritten or otherwise discarded from the memory 120.

Alternatively, or additionally, mosaic video formats 302 and their associated video mosaic names, and/or third party defined mosaic video formats 302 and their associated video mosaic names, may be communicated to the media device 102 in different manners. For example, user-defined or third party defined mosaic video formats 302 and the associated video mosaic names may be broadcast to many media device 102 in the media content stream 142. Receiving media device 102 could then store the received user-defined or third party defined mosaic video formats 302 into the mosaic video format database 140.

Figure 4:
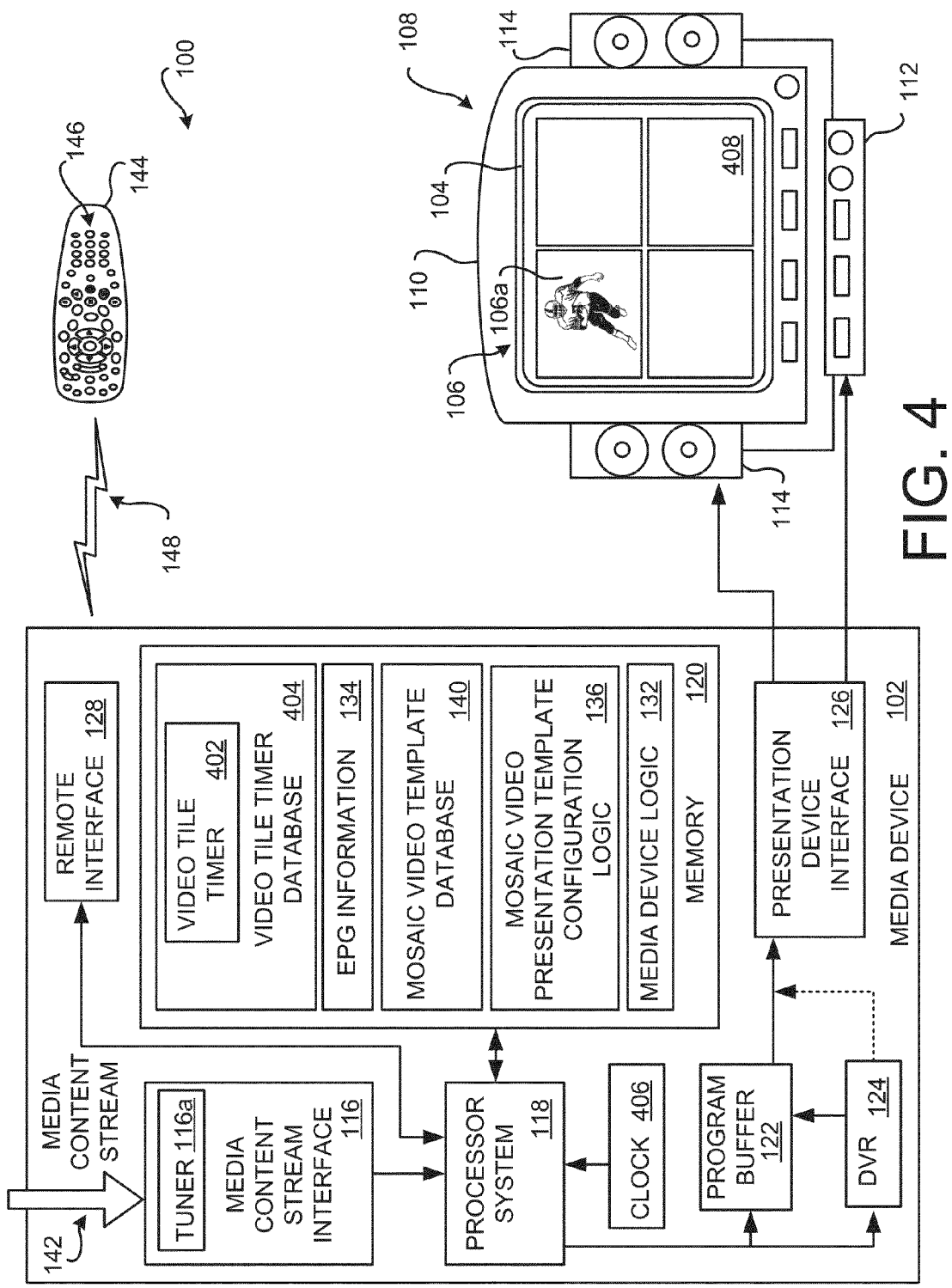
FIG. 4 is an illustrative diagram of an embodiment of a mosaic video format configuration system that operates with video tile timers stored in the memory.

FIG. 4 is an illustrative diagram of an embodiment of a mosaic video format configuration system 100 that optionally operates with one or more video tile timers 402 stored in a video timer tile database 404 residing in the memory 120. This non-limiting example optional embodiment may have one or more of the components of the media device 102 illustrated in FIGS. 1-3.

The use of video recording timers used to configure a media device 102 to record selected media content is well known in the arts. The media device 102 may be provisioned with a clock 406 that provides real time, or near real time, information to the processor. In some embodiments, the clock 406 may be remote from the media device 102.

With recording timers, the user identifies a particular program for recording (saving) into the DVR 124 or another memory medium. The program selected for recording has a start time (and corresponding day or date) that corresponds to a real time that the program is scheduled to be broadcasted to the media device 102 in the media content stream 142. The program also has an end time (and corresponding day or date) that corresponds to a real time that broadcast of the program is scheduled to be concluded. This information may reside in the EPG information 134.

When a user configures their media device 102 to record a particular program scheduled for a future broadcast, the start and end times (and corresponding day or date) of the broadcasting program are defined as a start record time and an end record time, respectively (and interchangeably referred to herein as video recording timers). The video recording timers that initiate and conclude the recording of the identified program is saved in the memory 120 along with the channel (and/or channel information) that the selected program is to be broadcasted on. When the real time, as monitored by the clock 406, reaches the time defined by the start video recording timer, one of the tuners 116*a* is operated to tune to the media content stream 142 having the specified program, and then recording of the program is initiated. When the real time reaches the time defined by the end video recording timer, recording of the program is concluded.

In some situations, the user may know that a particular program of interest will start to be broadcast at a particular time and on a particular channel. However, the user may otherwise miss the start of the broadcast of the program of interest because they are viewing a mosaic video with a plurality of video tiles 106 as described herein. Accordingly, the user might miss the beginning portion of the program of interest as the broadcast of that program commences at its broadcast start time.

Embodiment of the mosaic video format configuration system 100 are configured to monitor real time, as provided by the clock 406, compare the real time with the times associated with the video tile timers 402. When real time reaches a time defined by one or more of the video tile timers 402, video content in one of the video tiles 106 of a currently presenting video mosaic will be replaced with the video content of the program associated with the video tile timer 402. In some embodiments, the audio content portion of the program associated with the video tile timer 402 may be automatically presented. Accordingly, the user will realize that the broadcast of the selected program of interest has started.

A video tile timer 402 comprises a time that the program of interest is scheduled to commence its broadcast to the media device. A video tile timer 402 also comprises the channel information that identifies the channel that the program of interest is to be broadcast on. A video tile timer 402 is in contrast to video recording timers in that there is no end timer (that corresponds to the end recording timer), and there are no associated instructions for recording (which are otherwise required for the recording process of a program). Rather, the video tile timer 402 simply causes the processor system 118 to operate one of the tuners 116*a* to tune to the media content stream 142 having the channel identified by the video tile timer 402, and then the processor system 118 parses out the media content of the particular channel identified by the video tile timer 402. In some embodiments, the name of the program selected by the user may be optionally included in the video tile timer 402 information.

In such embodiments, a sacrifice video tile 408 is predefined (selected) from one of the presented video tiles 106 of a currently presented video mosaic. This sacrifice video tile 408 has its current video content replaced (hence, "sacrificed") by the video content of the channel identified by the video tile timer 402 when real time reaches the time defined by the video tile timer 402.

In an example embodiment, a video tile timer 402 may be generated via the user's input made via the EPG. The user may navigate about a presented EPG to identify a program of interest that is scheduled to be broadcast at some future point in time. After the user navigates to and selects the program of interest, that program's broadcast start time is retrieved from the EPG information along with its channel identifier (or other information associated with its channel). The broadcast start time and the channel information is then saved as the video tile timer 402. In an example embodiment, one of the controllers 146 on the remote control 144 may be dedicated to setting a video tile timer 402 (while another one of the controllers 146 are dedicated to setting up recording timers).

In the simplified example of FIG. 4, the lower right-hand video tile 106 has been defined as the sacrifice video tile 408. In some embodiments, the sacrifice video tile 408 may be set as a default either by the vendor of the media device 102, by an interested third party, and/or by the user.

Some embodiments may support multiple hierarchical-ordered sacrifice video tiles 408 that support a plurality of concurrently operating video tile timers 402. Thus, if a first program of interest begins to be broadcast at a first time, the video portion of that first program will start to be shown in the first sacrifice video tile 408 as its broadcast begins. Then, when the broadcast of the next program of interest starts, then the second sacrifice video tile 408 will be used for that second program. (Alternatively, one sacrifice video tile 408 may be used, wherein the video content of the later starting second program merely replaces video content of the first program.)

Alternatively, the sacrifice video tile(s) 408 may be dynamically identified by the mosaic video format configuration system 100. In such embodiments, one of the video tiles 106 is automatically selected as the sacrifice video tile 408. For example, the user may have been listening more to the audio portions of one or more of the video tiles 106 and not listening to (or listening less often to) the audio portion of another video tile 106. Here, the less-listened-to video tile 106 is identified and then is automatically selected as the sacrifice video tile 408. Alternatively, or additionally, the user may have been watching in a full screen mode one or more of the video tiles 106 and not watching in full screen mode (or watching less often) another video tile 106. Here, the less-watched video tile 106 is identified and then is automatically selected as the sacrifice video tile 408.

Alternatively, some of the video tiles 106 may be identified on a user's favorites list, viewing history, recommended list, or other preferential listing. Here, a video tile 106 that is not on such a preference listing is identified and then is automatically selected as the sacrifice video tile 408.

Some embodiments, at some time before the start of the broadcast of the program on the channel identified by the video tile timer 402, will provide a pop-up notice or the like on the display 104 that indicates to the user of the potential upcoming conflict between the currently presented video mosaic and the program that will begin broadcasting shortly. That is, the video tile timer 402 includes a notification duration that initiates presentation of the notification prior to the broadcast start time of the program of interest. In response to viewing the presented notification, the user may opt to end presentation of the mosaic video to watch the identified program. Alternatively, the user may choose and select one of the currently presented video tiles 106 to be the sacrifice video tile 408. Alternatively, the user may simply change to a different mosaic video (based on a different mosaic video presentation format 302) that includes the channel (and/or program) that is identified by the video tile timer 402. Alternatively, or additionally, the notification may provide an option to the user to record the upcoming program identified by the video tile timer 402, wherein presentation of the currently presented video mosaic is not interrupted.

To illustrate, the user may be watching football. At some point in time, a special program of interest may start to be broadcast. Since the user was interested in this newly broadcasting program, the user has generated a video tile timer 402 for this program (presumably before the broadcast start time of the program). When the broadcast of that program begins, the video content is presented to the user in the sacrifice video tile 408 (and optionally the audio content). Alternatively, the presentation of the video mosaic may end and be replaced by the program identified by the video tile timer 402. Alternatively, a presented notification may inform the user of the upcoming conflict.

Alternatively, when real time reaches the time defined by a video tile timer 402, the currently presented mosaic video may automatically change to a different mosaic video (based on a different user-defined mosaic video presentation format 302). For example, the currently presented mosaic video may be presenting video content using four video tiles 106. When the time defined by the video tile timer 402 occurs, a six video tile 106 mosaic video may then become presented, where the channel identified by the video tile timer 402 is presented concurrently with the four previously presenting channels. (The non-used new video tile 106 may remain unused, or may be populated with the video portion of another channel selected by a suitable process described herein). Here, embodiments automatically generate a mosaic video that includes the channels identified in the previous mosaic video format 302 (that was used to generate the prior presented mosaic video) and the channel identified by the video tile timer 402. The particular mosaic video template 202 selected for the newly created mosaic video format 302 would have at least one more video tiles 106 than the currently presenting mosaic video. Such a mosaic video template 202 may be predefined for selection for generation of the mosaic video format 302, or may be dynamically identified based on the number of video tiles 106 being currently presented.

Some embodiments of the mosaic video format configuration system 100 may allow a user to define a mosaic video template 202. To create a user-generated mosaic video template 202, a blank mosaic video template 202 is initially presented on the display 104. Alternatively, a mosaic video template 202 with one or more generic video tiles 106 may be presented. The user focuses on and then positions a first video tile 106 into a desired position or location of interest on display 104. A drag and drop process may be used to permit the user to dynamically locate each particular video tile 106 on the display area. Such drag and drop operations are known in the arts.

The user may optionally resize a selected video tile 106 to desired size. The video tile 106 of interest is focused on, and then a side and/or a corner of the video tile 106 may be grabbed (selected) for adjustment, thereby adjusting the dimensions of the selected video tile 106. Such window (video tile) resizing operations are known in the arts.

The user is able to relocate and/or resize any number of video tiles 106 as desired. Further, video tiles 106 may overlap each other, as in a PIP format.

Then, the user specifies name for their user-generated mosaic video template 202. Optionally, the user may specify genre description information. When the user is satisfied with the look and feel of their user-defined mosaic video template 202, the user defined mosaic video template 202 is stored in the mosaic video template database 138.

Then, when user wishes to create a user-defined mosaic video presentation format 302, the user initiates the process of generating a user-defined mosaic video format 302. Accordingly, their user-generated mosaic video template 202 is shown as a miniaturized graphical template representation 216 (with the optional user specified name) in an example embodiment. The user-generated mosaic video template 202 can then be focused on and selected for generation of a user-defined mosaic video presentation format 302 as described herein.

The user can delete a user-generated mosaic video template 202 at a later time if they try and don't like the user-defined mosaic video presentation format generated from their user-generated mosaic video template 202. Or, the user-generated mosaic video template 202 can be deleted or modified if the user no longer wants to use that particular user-generated mosaic video template 202.

It should be emphasized that the above-described embodiments of the mosaic video format configuration system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of generating mosaic video formats that are each configured to generate corresponding mosaic videos that present video content in video tiles, the method comprising:

receiving a selection of one of a plurality of mosaic video templates, wherein the selected mosaic video template defines a plurality of video tiles that will be presented in an associated mosaic video that is generated by a media device, wherein the selected mosaic video template has location information for each video tile that defines a presentation location of that video tile on a display when presented in the mosaic video, and wherein the selected mosaic video template has size information for each video tile that defines a size of that video tile on the display when presented in the mosaic video;

receiving a specification of a video mosaic name; and generating a mosaic video format that is identified by the specified video mosaic name, and that comprises the location information and the size information for each of the video tiles defined by the selected mosaic video template.

2. The method of claim 1, further comprising:

receiving a channel specification that identifies a channel in a media content stream received at the media device; and associating the specified channel with one of the video tiles of the selected mosaic video template, wherein the generated mosaic video format includes the channel specification for the associated video tile, and wherein the channel provides the video content that is presented in the associated video tile when the mosaic video generated based on the mosaic video format is presented on the display.

3. The method of claim 2, wherein prior to receiving the channel specification, the method further comprising:
presenting an electronic program guide (EPG) on the display,
wherein the channel specification for the video tile is received from a user via the presented EPG.

4. The method of claim 2, further comprising:
receiving, at the media device, genre information,
wherein the genre information includes description information that describes at least one characteristic that is common to the presented video content that is presented in the video tiles of the presented video mosaic, and
wherein the genre information includes genre time information;
comparing, at the media device, the genre information with program description information that describes programs scheduled for broadcast to the media device,
wherein the program description information is compared for those programs having a scheduled broadcast time that matches the genre time information; and
automatically selecting, by the media device, the channel that is scheduled to broadcast a program that has its program description information that matches the genre description information,
wherein the scheduled broadcast time of the selected program corresponds to the genre time information, and
wherein the selected channel is identified in the channel specification.

5. The method of claim 2, further comprising:
receiving genre information, wherein the genre information includes description information that describes at least one characteristic that is common to the presented video content that is presented in the video tiles of the presented video mosaic;
receiving, after the mosaic video format is generated, a user specification of a video mosaic name associated with one of the previously generated mosaic video formats;
accessing the genre information of the previously generated mosaic video format identified by the received video mosaic name,
comparing the genre information with program description information that describes programs currently broadcasting to the media device; and
selecting the channel that is currently broadcasting the program that has its program description information that matches the genre description information,
wherein the selected channel is identified in the channel specification.

6. The method of claim 1, wherein after the generated mosaic video format has been stored with a plurality of other previously generated mosaic video formats at the media device, the method further comprising:
receiving a user specification of the video mosaic name associated with the stored mosaic video format;
accessing the location information and the size information for each of the video tiles of the mosaic video format identified by the received video mosaic name;
presenting the video mosaic that displays the plurality of video tiles, wherein each video tile is displayed using the location information and size information of that video tile,
presenting different video content in each one of the video tiles.

7. The method of claim 6, wherein receiving the user specification of the video mosaic name comprises:
presenting a list of video mosaic names, wherein each of the video mosaic names corresponds to one of the plurality of previously generated mosaic video formats,
wherein the selected video mosaic name is selected by a user of the media device via the list of presented video mosaic names.

8. The method of claim 6, wherein receiving a user specification of the video mosaic name comprises:
presenting a plurality of graphical icons on the display,
wherein each of the plurality of graphical icons corresponds to one of the video mosaic name or the generated mosaic video presentation format,
wherein the selected video mosaic name is selected based on a selection by a user of the media device of an associated graphical icon being presented on the display.

9. The method of claim 1, wherein receiving the selection of one of a plurality of mosaic video templates comprises:
presenting a plurality of miniaturized graphical template representations on the display,
wherein each one of the of a plurality of miniaturized graphical template representations correspond to one of the plurality of mosaic video templates, and
wherein each miniaturized graphical template representation is an image that graphically indicates a relative size and a relative location of each of the video tiles defined by its associated mosaic video template; and
receiving a user selection of one of the presented miniaturized graphical template representations,
wherein the selected of one of the plurality of mosaic video templates corresponds to the selected miniaturized graphical template representation.

10. The method of claim 1, wherein the generated mosaic video format is generated at a remote site that is communicatively coupled to the media device, and wherein the generated mosaic video format includes a channel specification for each one of the video tiles of the generated mosaic video format and a unique video mosaic name, the method further comprising:
communicating the generated mosaic video format to the media device; and
storing the received mosaic video format at the media device,
wherein the video mosaic is generated by the media device using the stored mosaic video format in response to receiving a specification of the video mosaic name by a user of the media device.

11. The method of claim 1, wherein the selected mosaic video template is previously generated at a remote site that is communicatively coupled to the media device, the method further comprising:
communicating the selected mosaic video template to the media device; and
storing the received selected mosaic video template at the media device,
wherein the video mosaic is generated by the media device using the stored mosaic video template.

12. The method of claim 1, wherein the generated mosaic video format includes a channel specification for each one of the video tiles of the generated mosaic video format, wherein the generated mosaic video format is generated at a first media device that is communicatively coupled to a remote site, and the method further comprising:
communicating the generated mosaic video format to the remote site;
storing the received mosaic video format at the remote site; and
communicating the stored mosaic video format from the remote site to a second media device that is communicatively coupled to the remote site,
wherein the video mosaic is generated by the second media device based on the received mosaic video format.

13. The method of claim 1, further comprising:
receiving a user specification of a program of interest, wherein the program of interest is associated with a time that the program of interest is scheduled to commence its broadcast to the media device, and wherein the program of interest is associated with a channel that the program of interest is to be broadcast on;
generating a video tile timer, wherein the video tile timer consists of time information corresponding to the time that the program of interest is scheduled to commence its broadcast to the media device and channel information that identifies the channel that the program of interest is to be broadcast on; and
storing the generated video tile timer at the media device.

14. The method of claim 13, further comprising:
monitoring real time at the media device;
comparing the real time with the time information of the video tile timer;
presenting a notification to the user before the real time matches the time information of the video tile timer only if the mosaic video is being presented to the user.

15. The method of claim 13, further comprising:
monitoring real time at the media device;
comparing the real time with the time information of the video tile timer;
presenting the video content of the program of interest in a selected one of the video tiles only if the mosaic video is being presented to the user.

16. A media device, comprising:
a media content stream interface configured to receive at least one broadcasting media content stream;
a memory configured to store a plurality of mosaic video templates,
wherein each mosaic video template defines a plurality of video tiles that will be presented in an associated mosaic video that is generated by a media device,
wherein each mosaic video template has video tile location information for each video tile that defines a presentation location of that video tile on a display when presented in the mosaic video, and
wherein each mosaic video template has video tile size information for each video tile that defines a size of that video tile on the display when presented in the mosaic video;
a presentation device interface configured to communicate a plurality of miniaturized graphical template representations that are presented on the display,
wherein each one of the of a plurality of miniaturized graphical template representations correspond to one of the plurality of mosaic video templates, and
wherein each miniaturized graphical template representation is an image that graphically indicates a relative size and a relative location of each of the video tiles defined by its associated mosaic video template;
an interface, wherein the interface is configured to:
receive a user selection of one of the miniaturized graphical template representations, and
receive a user specification of a video mosaic name; and
a processor system, wherein the processor system is configured to:
retrieve the video tile location information and the video tile size information for each of the plurality of video tiles defined by the mosaic video template that corresponds to the selected miniaturized graphical template representation;
generate a mosaic video format that is identified by the specified video mosaic name, and that comprises the video tile location information and the video tile size information for each of the video tiles defined by the mosaic video template corresponding to the selected miniaturized graphical template representation; and
store the generated mosaic video format in the memory.

17. The media device of claim 16, wherein the processor system is further configured to:
receive a channel specification that identifies a channel in the media content stream received at the media device; and
associate the specified channel with one of the video tiles of the mosaic video template corresponding to the selected miniaturized graphical template representation,
wherein the generated mosaic video format includes the channel specification for the associated video tile, and
wherein the channel provides video content that is presented in the associated video tile when the mosaic video generated based on the mosaic video format is presented on the display.

18. The media device of claim 16, further comprising:
a remote system interface that is configured to communicatively couple the media device to a remote system via a communication network,
wherein the processor system is further configured to:
receive a third party mosaic video format from the remote site; and
store the received third party mosaic video format in the memory.

19. A method of controlling presentation of a mosaic video that is generated by a media device, the method comprising:
receiving a user specification of a program of interest, wherein the program of interest is associated with a time that the program of interest is scheduled to commence its broadcast to the media device, and wherein the program of interest is associated with a channel that the program of interest is to be broadcast on;
generating a video tile timer, wherein the video tile timer consists of time information corresponding to the time that the program of interest is scheduled to commence its broadcast to the media device and channel information that identifies the channel that the program of interest is to be broadcast on; and
storing the generated video tile timer at the media device;
receiving, after the video tile timer is generated and stored, a specification of a video mosaic name;
presenting the mosaic video on a display, wherein the presented mosaic video is generated in response to a user specification of the mosaic video name that is associated with one of a stored plurality of mosaic video formats, wherein each mosaic video format presents a unique number of video tiles that are presented using a unique configuration on the display, and wherein each video time presents video content from one of a plurality of different channels of broadcasting media content;

monitoring real time at the media device;

comparing the real time with the time information of the video tile timer;

presenting video content of the program of interest in a selected one of the video tiles of the presented mosaic video.

20. The method of claim 19, further comprising:

presenting a notification to the user at a time before the real time matches the time information of the video tile timer.

\* \* \* \* \*